US012560821B2

(12) United States Patent
Kon et al.

(10) Patent No.: US 12,560,821 B2
(45) Date of Patent: Feb. 24, 2026

(54) THREE-DIMENSIONAL DISPLAY DEVICE AND CIRCULARLY POLARIZED GLASSES

(71) Applicant: Arisawa MFG. Co., Ltd., Niigata (JP)

(72) Inventors: Shigehiko Kon, Niigata (JP); Yasuaki Umezawa, Niigata (JP); Kazuhiro Ura, Niigata (JP); Tatsuya Sato, Niigata (JP)

(73) Assignee: Arisawa MFG. Co., Ltd., Niigata (JP)

( * ) Notice: Subject to any disclaimer, the term of this patent is extended or adjusted under 35 U.S.C. 154(b) by 592 days.

(21) Appl. No.: 17/925,057

(22) PCT Filed: Jun. 11, 2021

(86) PCT No.: PCT/JP2021/022264
§ 371 (c)(1),
(2) Date: Nov. 14, 2022

(87) PCT Pub. No.: WO2021/256392
PCT Pub. Date: Dec. 23, 2021

(65) Prior Publication Data
US 2023/0185107 A1 Jun. 15, 2023

(30) Foreign Application Priority Data
Jun. 17, 2020 (JP) ................................ 2020-104922

(51) Int. Cl.
*G02B 30/25* (2020.01)
(52) U.S. Cl.
CPC .................................... *G02B 30/25* (2020.01)
(58) Field of Classification Search
None
See application file for complete search history.

(56) References Cited

U.S. PATENT DOCUMENTS 8,044,879 B2 * 10/2011 Matveev ................ G02B 30/34
348/42
8,687,052 B2 * 4/2014 Ha .......................... G02B 30/25
348/42
(Continued)

FOREIGN PATENT DOCUMENTS

CN 101271198 A 9/2008
CN 102937728 A 2/2013
(Continued)

OTHER PUBLICATIONS

Office Action dated Jul. 31, 2024, issued for the corresponding Taiwan Patent Application No. 110121964.
(Continued)

*Primary Examiner* — Jyotsna V Dabbi
(74) *Attorney, Agent, or Firm* — Ohlandt, Greeley and Perle, LLP.

(57) ABSTRACT

A three-dimensional display device includes: a first image display that outputs linearly polarized first image light; a second image display that outputs linearly polarized second image light; a first retardation plate that modulates and converts the first image light output from the first image display to first elliptically polarized light; a second retardation plate that modulates and converts the second image light output from the second image display to second elliptically polarized light that rotates in a direction identical to a rotation direction of the first elliptically polarized light; and a half mirror that transmits the first elliptically polarized light, converts the first elliptically polarized light to first circularly polarized light that rotates in a direction identical to the rotation direction of the first elliptically polarized light, reflects the second elliptically polarized light, and converts the second elliptically polarized light to second circularly polarized light that rotates in a direction opposite (Continued)

100

CIRCLE 1

110 112

114 130

135
131
136
133

170

151

α
γ β

152

124

122

120

90

VERTICAL DIRECTION

HORIZONTAL DIRECTION the rotation direction of the second elliptically polarized light.

3 Claims, 5 Drawing Sheets

(56) References Cited

U.S. PATENT DOCUMENTS

| | | | |
|---|---|---|---|
| 2002/0005820 A1 | 1/2002 | Son et al. | |
| 2007/0159602 A1 | 7/2007 | Fergason | |
| 2011/0164120 A1 | 7/2011 | Ha et al. | |
| 2016/0026039 A1* | 1/2016 | Sakai | G06F 3/1446 |
| | | | 345/1.3 |
| 2017/0176655 A1 | 6/2017 | Suzuki et al. | |
| 2018/0063520 A1 | 3/2018 | Chung et al. | |
| 2021/0207030 A1* | 7/2021 | Ota | H10K 59/8791 |

FOREIGN PATENT DOCUMENTS

| | | | |
|---|---|---|---|
| CN | 107797299 | A | 3/2018 |
| JP | 2001042261 | A | 2/2001 |
| JP | 2003202520 | A | 7/2003 |
| JP | 2012501483 | A | 1/2012 |
| JP | 2012-032527 | A | 2/2012 |
| KR | 20180071593 | A | 6/2018 |

OTHER PUBLICATIONS

Extended European Search Report dated Nov. 20, 2023 for European Appl. No. 21826250.09.
International Search Report dated Aug. 10, 2021 in corresponding International PCT Patent Application PCT/JP2021/022264, 6 pgs.

* cited by examiner

THREE-DIMENSIONAL DISPLAY DEVICE AND CIRCULARLY POLARIZED GLASSES

TECHNICAL FIELD

The present disclosure relates to a three-dimensional display device and circularly polarized glasses.

BACKGROUND ART

Three-dimensional display devices capable of displaying an image that appears three-dimensional are known. For example, Patent Literature 1 describes a three-dimensional display device that includes two monitors, a circular polarizing filter, and a half mirror. This three-dimensional display device is a device that uses the circular polarizing filter to convert image light sent from each of the two monitors to circularly polarized light, and uses the half mirror to overlay the converted circularly polarized light to display an image that appears three-dimensional. An observer wearing circularly polarized glasses can view the displayed image as a three-dimensional image.

CITATION LIST

Patent Literature

Patent Literature 1: Unexamined Japanese Patent Application Publication No. 2001-42261

SUMMARY OF INVENTION

Technical Problem

With the three-dimensional display device described in Patent Literature 1, the polarization state may collapse while the image light travels through the circular polarizing filter and the half mirror to the observer. Consequently, when an observer wearing circularly polarized glasses views the three-dimensional image using the three-dimensional display device described in Patent Literature 1, so-called crosstalk, in which the image light intended to be seen by the right eye is seen by the left eye, and the image light intended to be seen by the right eye is seen by the left eye, occurs.

The present disclosure is made with the view of the above situation, and an objective of the present disclosure is to provide a three-dimensional display device and circularly polarized glasses in which the occurrences of crosstalk are few.

Solution to Problem

[1] A three-dimensional display device according to the present disclosure that achieves the aforementioned objective includes: a first image display that outputs linearly polarized first image light; a second image display that outputs linearly polarized second image light; a first retardation plate that modulates and converts the first image light output from the first image display to first elliptically polarized light; a second retardation plate that modulates and converts the second image light output from the second image display to second elliptically polarized light that rotates in a direction identical to a rotation direction of the first elliptically polarized light; and a half mirror that transmits the first elliptically polarized light, converts the first elliptically polarized light to first circularly polarized light that rotates in a direction identical to the rotation direction of the first elliptically polarized light, reflects the second elliptically polarized light, and coverts the second elliptically polarized light to second circularly polarized light that rotates in a direction opposite the rotation direction of the second elliptically polarized light, wherein the first image display and the second image display are arranged such that an image display surface displaying an image of the first image display and an image display surface displaying an image of the second image display form a predetermined angle, and the half mirror is arranged such that, in a region in which the first image light and the second image light cross, an angle formed between the image display surface of the first image display and a surface of the half mirror facing the first image display, and an angle formed between the image display surface of the second image display and a surface of the half mirror facing the second image display are equivalent.

[2] The first retardation plate and the second retardation plate may include a substrate, and an alignment layer and a liquid crystal layer laminated in this order on the substrate.

[3] A retardation value of the first retardation plate may be from 136 nm to 165 nm, and a retardation value of the second retardation plate may be from 72 nm to 114 nm.

[4] The half mirror may include a substrate, and a chrome layer laminated on the substrate.

[5] Circularly polarized glasses used together with the three-dimensional display device of any of [1] to [4], a lens constituting the circularly polarized glasses having a configuration in which a $\lambda/4$ retardation film is laminated on a polarizing plate.

Advantageous Effects of Invention

According to the present disclosure, a three-dimensional display device and circularly polarized glasses in which the occurrences of crosstalk are few can be provided.

DESCRIPTION OF EMBODIMENTS

Hereinafter, embodiments of the present disclosure (hereinafter referred to simply as "embodiments") are described in detail. Note that the embodiments are given in order to describe the present disclosure, and should not be construed as limiting the present disclosure to the details contained therein. Moreover, the present disclosure may be modified within the broader spirit and scope thereof.

Hereinafter, the configuration of a three-dimensional display device 100 according to an embodiment is described while referencing FIGS. 1 and 2.

Figure 1:
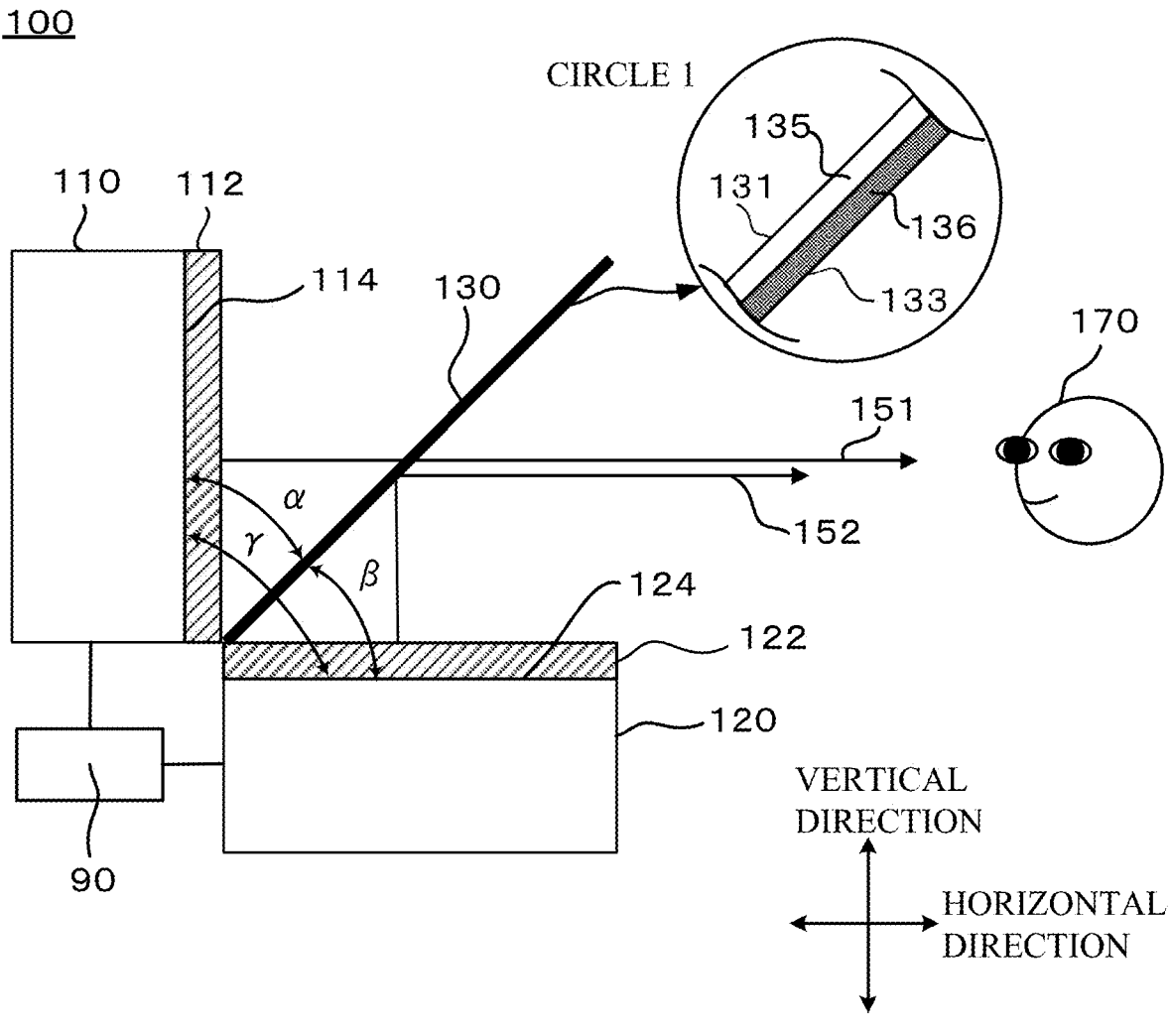
FIG. 1 is a schematic configuration drawing of a three-dimensional display device according to an embodiment.

As illustrated in FIG. 1, the three-dimensional display device 100 includes a controller 90, a first image display 110, a second image display 120, a first retardation plate 112, a second retardation plate 122, and a half mirror 130.

The controller 90 is connected to the first image display 110 and the second image display 120, and supplies, on the basis of image data supplied from an external source, image data of a right parallax image of a display subject to the first image display 110, and image data of a left parallax image of the display subject to the second image display 120. Note that the right parallax image and the left parallax image are, respectively, an image obtained by observing the display subject from a right-side viewpoint and an image obtained by observing the display subject from a left-side viewpoint.

In accordance with the image data supplied from the controller 90, the first image display 110 and the second image display 120 respectively display the parallax images of the display subject on an image display surface 114 and an image display surface 124. In the following, light emitted from the image display surface 114 and the image display surface 124 and that includes the display image is respectively referred to as "first image light 151" and "second image light 152."

The image display surface 114 and the image display surface 124 are respectively provided with a polarizing plate 116 and a polarizing plate 126 (not illustrated in FIG. 1). In a case in which the first image display 110 and the second image display 120 are stood up in a vertical direction, the directions of the transmission axes of the polarizing plate 116 and the polarizing plate 126 are parallel to the vertical direction.

The first image display 110 and the second image display 120 are, respectively, configured from a display device such as a liquid crystal display panel, an organic electro-luminescence (EL) display panel provided with a polarizing plate, or the like.

The first retardation plate 112 and the second retardation plate 122 respectively have a configuration in which an alignment layer is formed on a substrate, and a liquid crystal layer is formed on the alignment layer. The substrate has a film-like or plate-like shape. From the perspective of productivity, a thickness of the substrate is from 0.01 to 10 mm. The material constituting the substrate is not particularly limited provided the material has high transparency, low birefringence, and superior optical properties. Examples thereof include cycloolefin-based polymers such as cycloolefin polymer (COP) and cycloolefin copolymer (COC), triacetyl cellulose (TAC)-based polymers, glass, and the like. Glass is preferable from the perspective of dimensional stability. A known light-aligning compound can be used as the material that constitutes the alignment layer. Examples of the light-aligning compound include photodegradable, photodimerization, photoisomerization, and similar compounds. From the perspective of controlling the alignment of the liquid crystal molecules constituting the liquid crystal layer, a thickness of the alignment layer is from 0.001 to 10 μm. The material constituting the liquid crystal layer is not particularly limited provided that the material is a liquid crystal polymer that is cured by ultraviolet light or heat. From the perspective of modulating the polarization state of the first image light 151 and the second image light 152, a linear liquid crystal polymer is preferable as the liquid crystal polymer. The polarization state of the image light can be efficiently modulated as a result of the liquid crystal molecules of a portion of this linear liquid crystal polymer being aligned parallel to a main plane (XY plane direction) of the glass plate. From the perspective of efficiently modulating the polarization state, a thickness of the liquid crystal layer is from 0.1 to 20 μm. A retardation value of the retardation plate is adjusted by changing the thickness of the alignment layer and the thickness of the liquid crystal layer.

As the first retardation plate 112 and the second retardation plate 122, not only can a retardation plate provided with an alignment layer and a liquid crystal layer be used, but also a retardation plate formed by stretching a polycarbonate film can be used. The retardation value of the retardation plate in such a case can be adjusted by adjusting the degree of stretching of the polycarbonate film.

As illustrated in circle 1 of FIG. 1, the half mirror 130 includes a substrate 135 and a half mirror layer 136 formed on the substrate 135. The half mirror 130 has a function of transmitting a portion of incident light, and reflecting a portion of incident light. From the perspective of dimensional stability, the material constituting the substrate 135 is preferably glass. From the perspective of productivity, a thickness of the substrate 135 is from 0.01 to 10 mm. From the perspective of durability, the material constituting the half mirror layer 136 is a metal such as gold, silver, aluminum, and chrome, and is preferably chrome. From the perspective of obtaining sufficient reflection of the incident light, a thickness of the half mirror layer 136 is from 0.5 nm to 50 nm. The half mirror layer 136 can, for example, be obtained by vapor depositing the metal on a surface of the substrate 135.

The half mirror layer 136 may be configured from a dielectric multilayer film including pluralities of high refractive index dielectric thin films formed from SiO, $Ta_2O_5$, $TiO_2$, $Y_2O_3$, ZnSe, ZnS, $ZrO_2$ or the like, and low refractive index dielectric thin films formed from $Al_2O_3$, $CaF_2$, $MgF_2$, MgO, $SiO_2$, $Si_2O_3$, or the like, laminated in an alternating manner.

Next, the optical arrangements of the various components of the three-dimensional display device 100 are described.

The first image display 110 and the second image display 120 are arranged such that the image display surface 114 and the image display surface 124 form an angle γ. From the perspective of delivering, to the observer 170 and via the half mirror 130, a large amount of the image light emitted from the first image display 110 and the second image display 120, the angle γ is from 85° to 100°, and is preferably from 90° to 100°. From the perspective of miniaturizing the three-dimensional display device 100, the angle γ is preferably 90°.

The half mirror 130 is arranged in a region in which the first image light 151 and the second image light 152, emitted respectively from the first image display 110 and the second image display 120, cross. The half mirror 130 may be arranged with either a surface 131 of the substrate 135 or a surface 133 of the half mirror layer 136 facing the observer 170. From the perspective of suppressing the luminance of the first image light 151 emitted from the first image display 110, the half mirror 130 is preferably arranged so that the surface 133 of the half mirror layer 136 faces the observer 170.

The positional relationship between the half mirror 130, the first image display 110, and the second image display 120 is expressed by the equation α=β=γ/2. The angle α is an angle formed between the image display surface 114 and the half mirror 130. The angle β is an angle formed between the image display surface 124 and the half mirror 130. The angle α and the angle β are set so as to be equivalent. However, in this description, the angle α and the angle β being equivalent does not mean that the angle α and the angle β are geometrically exactly equivalent, but rather are equivalent to the degree that substantially equivalent optical effects are obtained. Accordingly, for both the angles α and β, a shift of approximately ±10° is allowable. In FIG. 1, the angle γ is 90°, and the angle α and the angle β are 45°, respectively.

The first retardation plate 112 is arranged on the image display surface 114. From the perspective of protecting the liquid crystal layer that forms the first retardation plate 112, the first retardation plate 112 is preferably mounted so that the surface of the liquid crystal layer of the first retardation plate 112 faces the image display surface 114. The second retardation plate 122 is arranged on the image display surface 124. From the perspective of protecting the liquid crystal layer that forms the second retardation plate 122, the second retardation plate 122 is preferably mounted so that the surface of liquid crystal layer of the second retardation plate 122 faces the image display surface 124.

Figure 2:
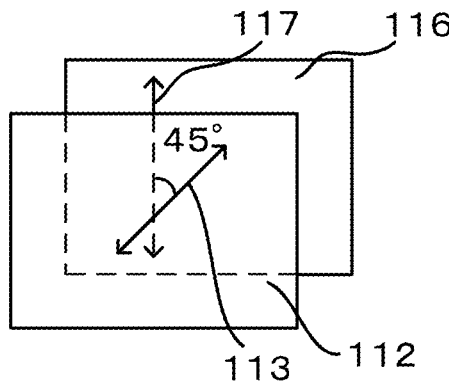
FIG. 2 is a drawing explaining the relationship between a slow axis of a retardation plate and a transmission axis of a polarizing plate.
Figure 2:
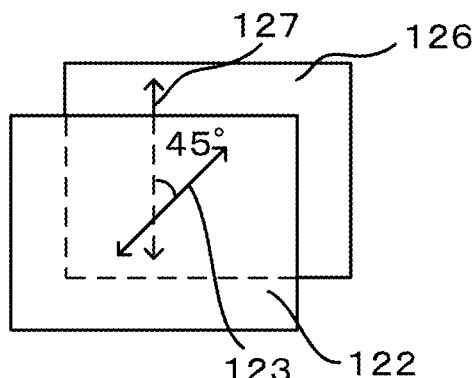

The relationship between the slow axis of the retardation plate and the transmission axis of the polarizing plate provided on the image display surface is described while referencing FIG. 2. The first retardation plate 112 is mounted with the slow axis 113 of the first retardation plate 112 inclined clockwise from 40° to 50°, and preferably 45°, with respect to the transmission axis 117 of the polarizing plate 116 provided on the first image display 110. The second retardation plate 122 is arranged with the slow axis 123 of the second retardation plate 122 inclined clockwise from 40° to 50°, and preferably 45°, with respect to the transmission axis 127 of the polarizing plate 126 provided on the second image display 120.

Examples of a method for fixing the first retardation plate 112 to the image display surface 114 include a method of fixing an outer periphery of the first retardation plate 112 to an outer periphery of the first image display 110 using a fastener or an adhesive, a method of fixing by applying a liquid adhesive to the surface of the image display surface 114 and mounting the first retardation plate 112, a method of fixing by adhering an adhesive sheet or an adhering sheet to the surface of the image display surface 114 and mounting the first retardation plate 112 thereon, and the like. From the perspectives of the transparency, weather resistance, and light resistance, the material constituting the liquid adhesive, the adhesive sheet, or the adhering sheet is preferably an acrylic resin-based resin composition. Examples of a method for fixing the second retardation plate 122 to the image display surface 124 include the same methods as those described for fixing the first retardation plate 112 to the image display surface 114.

Figure 3:
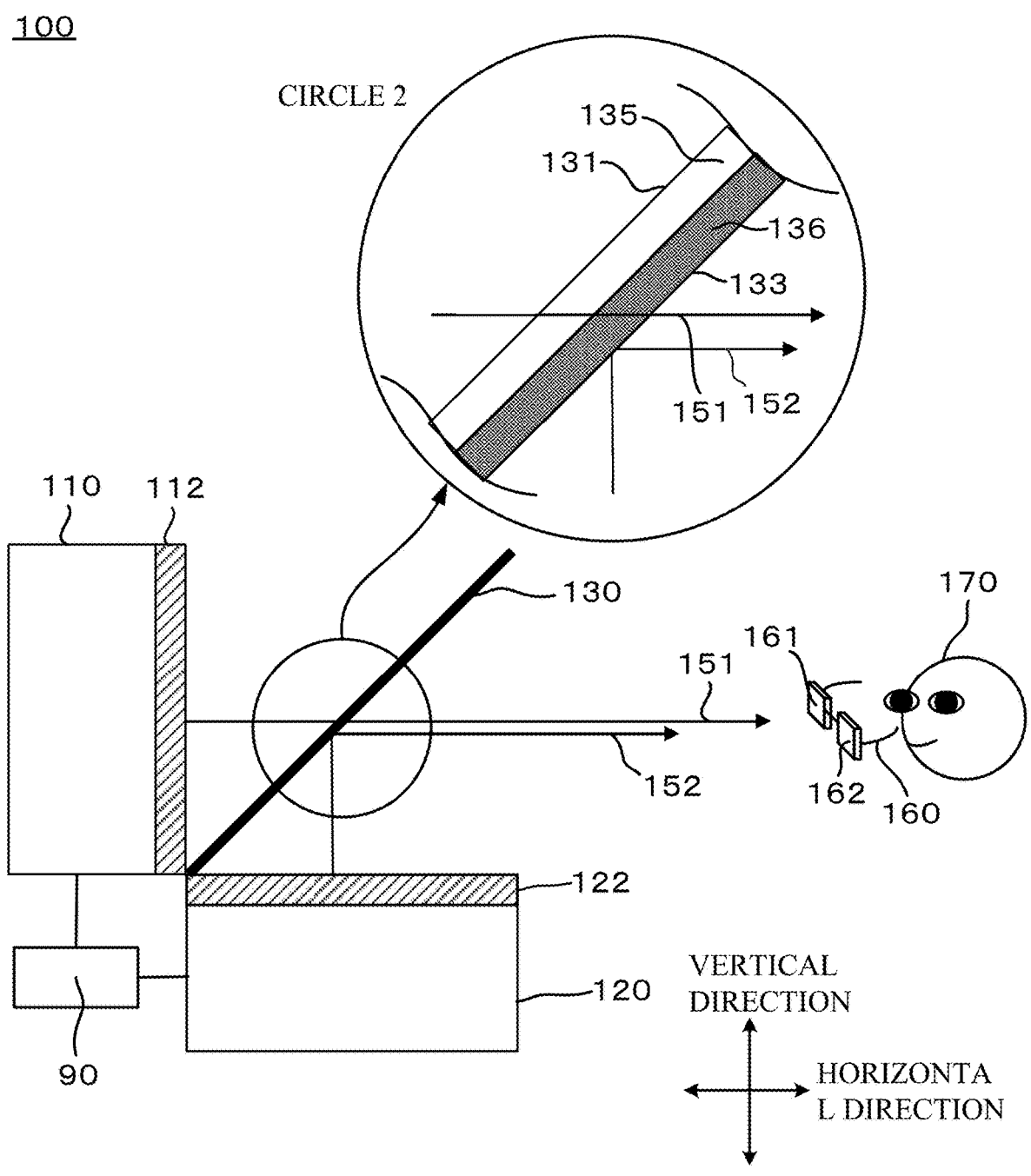
FIG. 3 is a schematic configuration drawing for explaining states of transmission and reflection of first image light and second image light in a half mirror illustrated in FIG. 1.

Next, the states of transmission and reflection of the first image light 151 and the second image light 152 are described while referencing FIG. 3. The first image light 151 is emitted from the first image display 110, transmits through the first retardation plate 112 and, as illustrated in the circle 2, enters the substrate 135 of the half mirror 130 through the surface 131, transmits through the half mirror layer 136, and exits from the surface 133. Then, the first image light 151 reaches the observer 170 through circularly polarized glasses 160. Due to transmitting through the half mirror 130, the luminance of the first image light 151 is reduced compared to before transmitting.

The second image light 152 is emitted from the second image display 120, transmits through the second retardation plate 122 and, as illustrated in the circle 2, reflects at the surface 133 of the half mirror layer 136, and reaches the observer 170 through the circularly polarized glasses 160. Due to reflecting at the surface 133 of the half mirror layer 136, the luminance of the second image light 152 is reduced compared to before reflecting.

Depending on differences in the material constituting the half mirror layer 136, the luminance of the first image light 151 that transmits through the half mirror 130 is lower or higher than the luminance of the second image light 152 that reflects at the surface 133 of the half mirror layer 136. In this case, the luminance of the first image light 151 emitted from the first image display 110 and the luminance of the second image light 152 emitted from the second image display 120 are preferably adjusted so that the observer 170 can recognize that the luminance of the first image light 151 and the luminance of the second image light 152 are substantially equivalent luminances.

Figure 4:
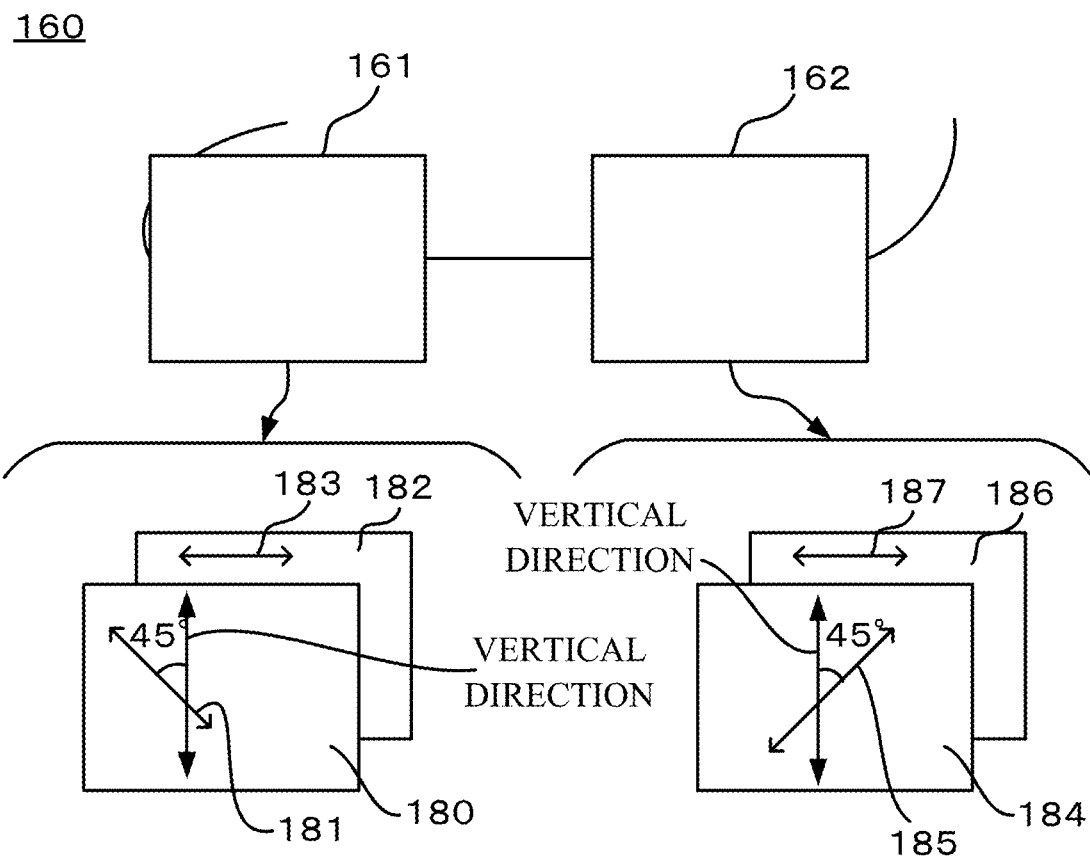
FIG. 4 is a drawing explaining the configuration of a right eye lens and a left eye lens of circularly polarized glasses.

Next, the configuration and the functions of the circularly polarized glasses 160 used together with the three-dimensional display device 100 are described while referencing FIG. 4. The circularly polarized glasses 160 include a right eye lens 161 and a left eye lens 162.

The right eye lens 161 has a configuration in which a λ/4 retardation film 180 is laminated on a polarizing plate 182. The right eye lens 161 is attached to the circularly polarized glasses 160 such that the polarizing plate 182 is arranged on the observer 170 side. When viewing from the observer 170, a slow axis 181 of the λ/4 retardation film 180 is inclined 45° clockwise with respect to the vertical direction. The polarizing plate 182 is arranged so that an absorption axis thereof is vertical and a transmission axis 183 is horizontal (orthogonal to the vertical direction).

The left eye lens 162 has a configuration in which a λ/4 retardation film 184 is laminated on a polarizing plate 186. The left eye lens 162 is attached to the circularly polarized glasses 160 such that the polarizing plate 186 is arranged on the observer 170 side. When viewing from the observer 170, a slow axis 185 of the λ/4 retardation film 184 is orthogonal to the slow axis 181 of the λ/4 retardation film 180. That is, when viewing from the observer 170, the slow axis 185 is inclined 45° counterclockwise with respect to the vertical direction. The polarizing plate 186 is arranged so that an absorption axis thereof is vertical and a transmission axis 187 is horizontal (orthogonal to the vertical direction).

Figure 5:
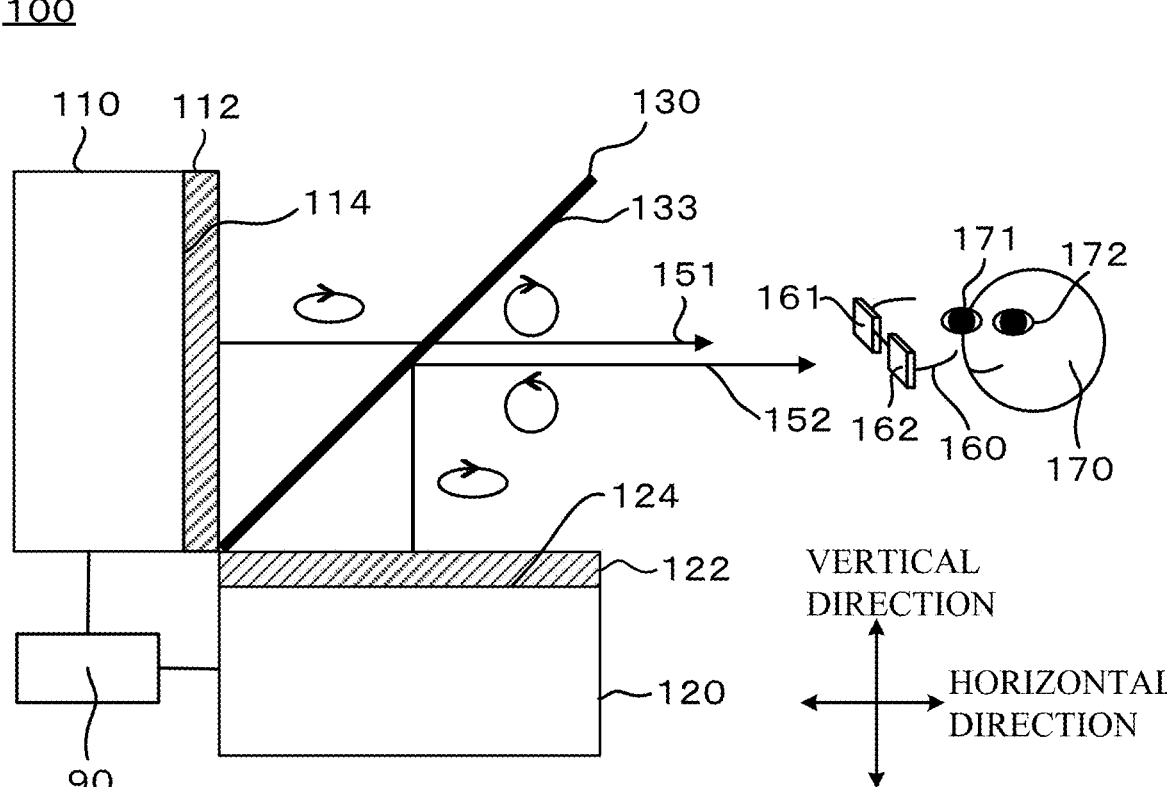
FIG. 5 is a schematic configuration drawing for explaining the effects of displaying a three-dimensional image in the three-dimensional display device illustrated in FIG. 1.

Next, the operations for the three-dimensional display device 100 to display an image that appears three-dimensional are described while referencing FIG. 5.

Note that, in the following description of the operations, it is desirable that the polarization states of the first image light 151 and the second image light 152 are based on the wavelength that the observer 170 is most sensitive to, for example, the wavelength of approximately the center section of the visible light spectrum, that is, a wavelength of approximately 550 nm, which appears as green. However, the present disclosure is not limited thereto, and the polarization states may be based on other wavelengths.

The first image light 151 immediately after being emitted from the image display surface 114 transmits through the polarizing plate 116 (not illustrated in FIG. 5) provided on the image display surface 114 and, as a result becomes linearly polarized light that oscillates in the same direction as the direction of the transmission axis 117 of the polarizing plate 116. When this linearly polarized light transmits through the first retardation plate 112, the phase of the polarization component transmitting through the slow axis 113 of the first retardation plate 112 is retarded, and the linearly polarized light is modulated to right-rotation elliptically polarized light in which the long axis is orthogonal to the transmission axis 117 of the polarizing plate 116. A size ratio of the long axis to the short axis of this elliptically polarized light is 1.5:1. When this elliptically polarized light transmits through the half mirror 130, the angle of incidence is substantially 45° and, as such, an intensity ratio of the s polarization component to the p polarization component of the elliptically polarized light approaches 1.0, and the elliptically polarized light becomes right-rotation circularly polarized light.

The second image light 152 immediately after being emitted from the image display surface 124 transmits through the polarizing plate 126 (not illustrated in FIG. 5) provided on the image display surface 124 and, as a result becomes linearly polarized light that oscillates in the same direction as the direction of the transmission axis 127 of the polarizing plate 126. When this linearly polarized light transmits through the second retardation plate 122, the phase of the polarization component transmitting through the slow axis 123 of the second retardation plate 122 is retarded, and the linearly polarized light is modulated to right-rotation elliptically polarized light in which the long axis is parallel to the transmission axis 127 of the polarizing plate 126. A size ratio of the long axis to the short axis of this elliptically polarized light is 2.6:1. When this elliptically polarized light reflects at the half mirror layer 136 of the half mirror 130, the rotation direction of the elliptically polarized light reverses and, furthermore, the angle of incidence is substantially 45° and, as such, at the same time, the intensity ratio of the s polarization component to the p polarization component approaches 1.0, and the elliptically polarized light becomes left-rotation circularly polarized light.

When the right-rotation circularly polarized light 151 transmits through the λ/4 retardation film 180 of the right eye lens 161, the phase of the right-rotation circularly polarized light 151 shifts, and the right-rotation circularly polarized light 151 is modulated to linearly polarized light in which the oscillation direction is the horizontal direction. Since the transmission axis 183 of the polarizing plate 182 is substantially horizontal, the linearly polarized light 151 transmits through the polarizing plate 182 and reaches the right eye 171. Meanwhile, when the left-rotation circularly polarized light 152 transmits through the λ/4 retardation film 180 of the right eye lens 161, the phase of the circularly polarized light 152 shifts, and the left-rotation circularly polarized light 152 is modulated to linearly polarized light in which the oscillation direction is the vertical direction. Since the transmission axis 183 of the polarizing plate 182 is the horizontal direction and the absorption axis is the vertical direction, the linearly polarized light 152 is absorbed by the polarizing plate 182 and does not reach the right eye 171. Accordingly, the observer 170 can recognize only the first image light 151 by the right eye 171.

When the left-rotation circularly polarized light 152 transmits through the λ/4 retardation film 184 of the left eye lens 162, the phase of the left-rotation circularly polarized light 152 shifts, and the left-rotation circularly polarized light 152 is modulated to linearly polarized light in which the oscillation direction is the horizontal direction. Since the transmission axis 187 of the polarizing plate 186 is substantially horizontal, the linearly polarized light 152 transmits through the polarizing plate 186 and reaches the left eye 172. Meanwhile, when the right-rotation circularly polarized light 151 transmits through the λ/4 retardation film 184 of the left eye lens 162, the phase of the circularly polarized light 151 shifts, and the right-rotation circularly polarized light 151 is modulated to linearly polarized light in which the oscillation direction is the vertical direction. Since the transmission axis 187 of the polarizing plate 186 is the horizontal direction and the absorption axis is the vertical direction, the linearly polarized light 151 is absorbed by the polarizing plate 186 and does not reach the left eye 172. Accordingly, the observer 170 can recognize only the second image light 152 by the left eye 172.

The first image light 151 includes the right parallax image of the display subject, and the second image light 152 includes the left parallax image of the display subject. The observer 170 recognizes a three-dimensional image as a result of the left parallax image and the right parallax image being combined in the brain of the observer 170.

The three-dimensional display device 100 and the circularly polarized glasses 160 are described above as an embodiment. The arrangement angles of the polarizing plates, the retardation plates, and the half mirror can be changed as appropriate. Additionally, the configurations of the various components can be changed to any configuration capable of realizing the same functions.

For example, in the embodiment described above, the first image light 151 is modulated to right-rotation circularly polarized light, and the second image light 152 is modulated to left-rotation circularly polarized light, but a configuration is possible in which the first image light 151 is modulated to left-rotation circularly polarized light, and the second image light 152 is modulated to right-rotation circularly polarized light. In such a case, the right eye lens 161 of the circularly polarized glasses 160 is configured so as to transmit left-rotation circularly polarized light, and the left eye lens 162 is configured so as to transmit right-rotation circularly polarized light.

Additionally, the arrangement relationships of the various polarizing plates and retardation plates can be changed as appropriate. For example, the optical arrangement of the polarizing plate 116 and the first retardation plate 112 can be set as desired, provided that circularly polarized light of a direction (first rotation direction) the same as the rotation direction of the elliptically polarized light can be generated by the half mirror 130. Likewise, the optical arrangement of the polarizing plate 126 and the second retardation plate 122 can be set as desired, provided that circularly polarized light of a second direction that is the opposite direction of the first rotation direction can be generated by the half mirror 130. The same applies to the optical arrangements of the retardation film 180, the retardation film 184, the polarizing plate 182, and the polarizing plate 186 constituting the right eye lens 161 and the left eye lens 162 of the circularly polarized glasses 160.

Additionally, the retardation values of the first retardation plate 112 and the second retardation plate 122 can be adjusted as appropriate in accordance with the optical properties of the other members. For example, when the half mirror layer 136 of the half mirror 130 is constituted by a chrome layer, from the perspective of suppressing crosstalk to 2.0% or less, the retardation value of the first retardation plate 112 is preferably in a range of 136 nm to 165 nm and, from the perspective of suppressing crosstalk to 1.0% or less, is more preferably in a range of 136 to 156 nm. From the perspective of suppressing crosstalk to 2.0% or less, the retardation value of the second retardation plate 122 is preferably in a range of 72 to 114 nm and, from the perspective of suppressing crosstalk to 1.0% or less, is more preferably in a range of 82 to 103 nm.

EXAMPLES

Hereinafter, the present disclosure is described in further detail using examples and comparative examples, but the present disclosure is not limited in any way to these examples.

The following specific devices and materials were used in the examples and comparative example.

(1) Liquid Crystal Display (Liquid Crystal Monitor)

A liquid crystal monitor was used as the image display. The liquid crystal monitor that was used was a 32 inch (screen size; lateral screen width (long side) 70.71 cm, vertical screen width (short side) 39.83 cm), in-plane switching (IPS) monitor, in which the transmission axis of the polarizing plate provided on the surface of the liquid crystal monitor was parallel to the short side of the liquid crystal monitor.

(2) Half Mirror

The half mirror 130 that was used was obtained by vapor depositing chrome on the surface of a soda glass substrate having a thickness of 2.7 mm. The half mirror 130 had a transmittance of 33% and a reflectance of 24%.

(3) Retardation Plate

The retardation plate that was used was obtained by laminating an alignment layer and a liquid crystal layer in this order on a glass substrate. The retardation plate having a retardation value of 72 nm was fabricated as follows.

Retardation Plate (Retardation Value: 72 nm)

A dimerization type polymer (ROP-212, manufactured by ROLIC) was coated on a 32 inch glass substrate (lateral screen width (long side) 70.71 cm, vertical screen width (short side) 39.83 cm) having a thickness of 0.7 mm such that the thickness after drying was 0.1 μm. After drying the coated polymer, predetermined ultraviolet light was irradiated on the surface thereof until the cumulative light amount was 150 mJ/cm². Thus, the alignment layer was obtained. The irradiated ultraviolet light was ultraviolet B wave (UVB 280 nm to 320 nm) linearly polarized light. When viewing from the coated surface, the angle of the oscillation direction of this linearly polarized light was 45° counterclockwise with respect to the short side direction of the glass substrate.

Next, a rod-shaped liquid crystal polymer (RMS03-013C, manufactured by MERCK) was coated on the alignment layer such that the thickness after drying was 0.40 μm. Then, ultraviolet A waves (UVA 320 nm to 400 nm) were irradiated until the cumulative light amount was 1200 mJ/cm². Thus, the liquid crystal layer was obtained.

The retardation value of the obtained retardation plate was measured.

Herein, the retardation value refers to the phase difference between the fast axis and the slow axis. The retardation value was measured by using a phase difference measuring device (KOBRA-CCD, manufactured by Oji Scientific Instruments) to irradiate the retardation plate with light having a wavelength of 590 nm. Measuring was performed at three locations, namely the center and both ends of the retardation plate, and an average value (X) thereof was calculated. Then, the average value (X) was substituted into equation (1) below, and the retardation value (Y) at 550 nm was calculated.

$$Y = 1.03 \times X \tag{1}$$

X: Retardation value at 590 nm

Y: Retardation value at 550 nm

When viewing from the liquid crystal layer side, the angle of the slow axis of the retardation plate was 45° counterclockwise with respect to the short side direction of the glass substrate. The retardation value at 550 nm was 72 nm.

Retardation Plate (Retardation Value: 82 nm)

With the exception of coating the rod-shaped liquid crystal polymer on the alignment layer such that the thickness after drying of the liquid crystal layer was 0.45 μm, a retardation plate was fabricated using the same procedures used when fabricating the retardation plate (retardation value: 72 nm).

Retardation Plate (Retardation Value: 89 nm)

With the exception of coating the rod-shaped liquid crystal polymer on the alignment layer such that the thickness after drying of the liquid crystal layer was 0.49 μm, a retardation plate was fabricated using the same procedures used when fabricating the retardation plate (retardation value: 72 nm).

Retardation Plate (Retardation Value: 103 nm)

With the exception of coating the rod-shaped liquid crystal polymer on the alignment layer such that the thickness after drying of the liquid crystal layer was 0.56 μm, a retardation plate was fabricated using the same procedures used when fabricating the retardation plate (retardation value: 72 nm).

Retardation Plate (Retardation Value: 125 nm)

With the exception of coating the rod-shaped liquid crystal polymer on the alignment layer such that the thickness after drying of the liquid crystal layer was 0.71 μm, a retardation plate was fabricated using the same procedures used when fabricating the retardation plate (retardation value: 72 nm).

Retardation Plate (Retardation Value: 144 nm)

With the exception of coating the rod-shaped liquid crystal polymer on the alignment layer such that the thickness after drying of the liquid crystal layer was 0.79 μm, a retardation plate was fabricated using the same procedures used when fabricating the retardation plate (retardation value: 72 nm).

Retardation Plate (Retardation Value: 155 nm)

With the exception of coating the rod-shaped liquid crystal polymer on the alignment layer such that the thickness after drying of the liquid crystal layer was 0.85 μm, a retardation plate was fabricated using the same procedures used when fabricating the retardation plate (retardation value: 72 nm).

Retardation Plate (Retardation Value: 165 nm)

With the exception of coating the rod-shaped liquid crystal polymer on the alignment layer such that the thickness after drying of the liquid crystal layer was 0.90 μm, a retardation plate was fabricated using the same procedures used when fabricating the retardation plate (retardation value: 72 nm).

(4) Circularly Polarized Glasses

Circularly polarized 3D glasses (right eye lens CP125R, left eye lens CP125L, manufactured by MeCan Imaging Inc.) were used.

The fabrication, various evaluation methods, and measurement method in the examples and comparative examples were performed as follows.

Fabrication of Three-Dimensional Display Device 100

The three-dimensional display device 100 was obtained by assembling a hereinafter described liquid crystal monitor to which a retardation plate is fixed, and the half mirror 130.

Fabrication of Liquid Crystal Monitor to Which Retardation Plate is Fixed

The liquid crystal monitor to which a retardation plate is fixed was fabricated as follows. Firstly, the retardation plate was mounted on the liquid crystal monitor so as to align the surface of the liquid crystal layer of the retardation plate with the image display surface of the liquid crystal monitor. Next, the periphery of the image display surface and the periphery of the retardation plate were fixed using a fixing tool. When viewing from the glass surface of the glass substrate of the retardation plate, the slow axis of the retardation plate was 45° clockwise with respect to the oscillation direction of the linearly polarized light emitted from the liquid crystal monitor. Another liquid crystal monitor to which a retardation plate is fixed, fabricated in the same manner, was prepared. The first liquid crystal monitor was defined as the first image display 110, and the retardation plate fixed thereto was defined as the first retardation plate 112. The retardation plate (retardation value: 144 nm) was used for the first retardation plate 112. The second liquid crystal monitor was defined as the second image display 120, and the retardation plate fixed thereto was defined as the second retardation plate 122. The retardation plate (retardation value: 82 nm) was used for the second retardation plate 122.

Installation of First Image Display 110 (Liquid Crystal Monitor) and Second Image Display 120 (Liquid Crystal Monitor)

The second image display 120 was installed on the ground such that the image display surface 124 of the second image display 120 faced vertically upward. Next, the first image display 110 was installed such that one of the long sides of the first image display 110 erected in the vertical direction was aligned with one of the long sides of the second image display 120. That is, the first image display 110 and the second image display 120 were installed with the angle formed between the image display surface 114 of the first image display 110 and the image display surface 124 of the second image display 120 being vertical.

Arrangement of Half Mirror 130

The half mirror 130 was arranged in the region in which the first image light 151 and the second image light 152 cross. With the arranged half mirror 130, the surface on which the chrome is vapor deposited (half mirror layer 136) was facing the observer. Additionally, the half mirror 130 was arranged so that the angle formed between the image display surface 124 and the surface 133 of the half mirror layer 136 was 45°, and the angle formed between the image display surface 114 and the surface 131 of the substrate 135 (glass substrate) was 45°.

Measurement of Crosstalk (1) Measurement Conditions

In a dark room of 100 lux or less, the three-dimensional display device 100 and a luminance meter (CA-2000, manufactured by Konica Minolta, wide angle lens was used) were set so that a distance from the surface of the first retardation plate 112 of the three-dimensional display device 100 to the surface of the lens of the luminance meter was 600 mm. The luminance was measured at two locations, namely the center of the image display surface 114 and the center of the image display surface 124.

(2) Measurement Method

The right eye lens 161 and the left eye lens 162 of the circularly polarized glasses 160 were individually set in front of the lens of the luminance meter, and each of a right eye transmitted luminance, a right eye blocked luminance, a left eye transmitted luminance, and a left eye blocked luminance were measured as follows.

2-1 Right Eye Transmitted Luminance

The luminance of the image light that transmitted through the right eye lens 161 when displaying a white image (255/255 gradation) on the image display surface 114 and displaying a black image (0/255 gradation) on the image display surface 124 was measured.

2-2 Right Eye Blocked Luminance

The luminance of the image light that transmitted through the right eye lens 161 when displaying a black image (0/255 gradation) on the image display surface 114 and displaying a white image (255/255 gradation) on the image display surface 124 was measured.

2-3 Left Eye Transmitted Luminance

The luminance of the image light that transmitted through the left eye lens 162 when displaying a black image (0/255 gradation) on the image display surface 114 and displaying a white image (255/255 gradation) on the image display surface 124 was measured.

2-4 Left Eye Blocked Luminance

The luminance of the image light that transmitted through the left eye lens 162 when displaying a white image (255/255 gradation) on the image display surface 114 and displaying a black image (0/255 gradation) on the image display surface 124 was measured.

(3) Evaluation Method

The right eye transmitted luminance ($cd/m^2$), the right eye blocked luminance ($cd/m^2$), the left eye transmitted luminance ($cd/m^2$), and the left eye blocked luminance ($cd/m^2$) obtained by the measurement method of (2) were substituted into equations (2) and (3) to calculate a right eye crosstalk rate and a left eye crosstalk rate.

$$\text{Right eye crosstalk rate (\%)} = (\text{Right eye blocked luminance/right eye transmitted luminance}) \times 100 \qquad (2)$$

$$\text{Left eye crosstalk rate (\%)} = (\text{Left eye blocked luminance/left eye transmitted luminance}) \times 100 \qquad (3)$$

An average value (crosstalk rate) of the right eye crosstalk rate and the left eye crosstalk rate was calculated using equation (4).

$$\text{Crosstalk rate (\%)} = (\text{right eye crosstalk rate} + \text{left eye crosstalk rate})/2 \qquad (4)$$

Example 1

The three-dimensional display device 100 was fabricated in accordance with "Fabrication of three-dimensional display device 100." The "Retardation plate (retardation value: 144 nm)" was used for the first retardation plate 112, and the "Retardation plate (retardation value: 82 nm)" was used for the second retardation plate 122.

Example 2

The "Retardation plate (retardation value: 89 nm)" was used for the second retardation plate 122. Aside from this, the three-dimensional display device 100 was fabricated in the same manner as in Example 1.

Example 3

The "Retardation plate (retardation value: 155 nm)" was used for the first retardation plate 112, and the "Retardation plate (retardation value: 103 nm)" was used for the second retardation plate 122. Aside from this, the three-dimensional display device 100 was fabricated in the same manner as in Example 1.

Example 4

The "Retardation plate (retardation value: 72 nm)" was used for the second retardation plate 122. Aside from this, the three-dimensional display device 100 was fabricated in the same manner as in Example 1.

Example 5

The "Retardation plate (retardation value: 165 nm)" was used for the first retardation plate 112, and the "Retardation plate (retardation value: 103 nm)" was used for the second retardation plate 122. Aside from this, the three-dimensional display device 100 was fabricated in the same manner as in Example 1.

Comparative Example 1

The "Retardation plate (retardation value: 125 nm)" was used for the first retardation plate 112, and the "Retardation plate (retardation value: 125 nm)" was used for the second retardation plate 122. Aside from this, the three-dimensional display device 100 was fabricated in the same manner as in Example 1.

Comparative Example 2

The "Retardation plate (retardation value: 155 nm)" was used for the first retardation plate 112, and the "Retardation plate (retardation value: 125 nm)" was used for the second retardation plate 122. Aside from this, the three-dimensional display device 100 was fabricated in the same manner as in Example 1.

Comparative Example 3

The "Retardation plate (retardation value: 165 nm)" was used for the first retardation plate 112, and the "Retardation plate (retardation value: 125 nm)" was used for the second retardation plate 122. Aside from this, the three-dimensional display device 100 was fabricated in the same manner as in Example 1.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2020-104922, filed on Jun. 17, 2020, the entire disclosure of which is incorporated by reference herein

REFERENCE SIGNS LIST

90 Controller
100 Three-dimensional display device
110 First image display
120 Second image display
114, 124 Image display surface
112 First retardation plate
122 Second retardation plate
113, 123 Slow axis
116, 126, 182, 186 Polarizing plate
117, 127, 183, 187 Transmission axis
130 Half mirror
131, 133 Surface
135 Substrate
136 Half mirror layer
151 First image light, right-rotation elliptically polarized light, right-rotation circularly polarized light
152 Second image light, left-rotation elliptically polarized light, left-rotation circularly polarized light

TABLE 1

| | EXAMPLES | | | | | COMPARATIVE EXAMPLES | | |
| --- | --- | --- | --- | --- | --- | --- | --- | --- |
| | 1 | 2 | 3 | 4 | 5 | 1 | 2 | 3 |
| RETARDATON VALUE (nm) OF FIRST RETARDATION PLATE | 144 | 144 | 155 | 144 | 165 | 125 | 155 | 165 |
| POLARIZATION STATE | ELLIPTICAL | ELLIPTICAL | ELLIPTICAL | ELLIPTICAL | ELLIPTICAL | CIRCULAR | ELLIPTICAL | ELLIPTICAL |
| RETARDATION VALUE (nm) OF SECOND RETARDATION PLATE | 82 | 89 | 103 | 72 | 103 | 125 | 125 | 125 |
| POLARIZATION STATE | ELLIPTICAL | ELLIPTICAL | ELLIPTICAL | ELLIPTICAL | ELLIPTICAL | CIRCULAR | CIRCULAR | CIRCULAR |
| CROSSTALK RATE (%) | 0.9 | 0.8 | 1.0 | 1.4 | 1.8 | 3.8 | 3.8 | 4.7 |

With the three-dimensional display devices 100 of the examples, it was confirmed that the crosstalk rate was 2.0% or lower, and that the three-dimensional display devices had few doubled images and blurring of images. Meanwhile, with the three-dimensional display devices 100 of the comparative examples, it was confirmed that the crosstalk rate was 3.8% or higher, and that the devices had strong doubled images and blurring of images.

160 Circularly polarized glasses
161 Right eye lens
162 Left eye lens
180, 184 λ/4 retardation film
181, 185 Slow axis
170 Observer
171 Right eye
172 Left eye

What is claimed is:

1. A three-dimensional display device, comprising:

a first image display that outputs linearly polarized first image light;

a second image display that outputs linearly polarized second image light;

a first retardation plate that modulates and converts the first image light output from the first image display to first elliptically polarized light;

a second retardation plate that modulates and converts the second image light output from the second image display to second elliptically polarized light that rotates in a direction identical to a rotation direction of the first elliptically polarized light; and a half mirror that transmits the first elliptically polarized light, converts the first elliptically polarized light to first circularly polarized light that rotates in a direction identical to the rotation direction of the first elliptically polarized light, reflects the second elliptically polarized light, and converts the second elliptically polarized light to second circularly polarized light that rotates in a direction opposite the rotation direction of the second elliptically polarized light, wherein the first elliptically polarized light and the second elliptically polarized light do not include circularly polarized light, wherein the first image display and the second image display are arranged such that an image display surface displaying an image of the first image display and an image display surface displaying an image of the second image display form a predetermined angle, and the half mirror is arranged such that, in a region in which the first image light and the second image light cross, an angle formed between the image display surface of the first image display and a surface of the half mirror facing the first image display, and an angle formed between the image display surface of the second image display and a surface of the half mirror facing the second image display are equivalent, and the first retardation plate is placed on a polarizing plate such that a slow axis is 40° to 50° in a clockwise direction with respect to a transmission axis of the polarizing plate provided on the image display surface that displays an image of the first image display, the second retardation plate is disposed on a polarizing plate provided on the image display surface that displays an image of the second image display, such that a slow axis of the second retardation plate forms an angle of 40° to 50° in a clockwise direction with respect to a transmission axis of the polarizing plate, wherein a retardation value of the first retardation plate at 550 nm is 136 nm to 165 nm, and a retardation value of the second retardation plate at 550 nm is 72 nm to 114 nm; and the half mirror includes a substrate, and a chromium layer laminated on the substrate; and a thickness of the half mirror is 0.5 nm-50 nm.

2. The three-dimensional display device according to claim 1, wherein the first retardation plate and the second retardation plate include a substrate, and an alignment layer and a liquid crystal layer laminated in this order on the substrate.

3. Circularly polarized glasses used together with the three-dimensional display device according to claim 1, a lens constituting the circularly polarized glasses having a configuration in which a $\lambda/4$ retardation film is laminated on a polarizing plate.

* * * * *